(12) United States Patent
Tsirkin

(10) Patent No.: US 9,875,132 B2
(45) Date of Patent: Jan. 23, 2018

(54) INPUT OUTPUT MEMORY MANAGEMENT UNIT BASED ZERO COPY VIRTUAL MACHINE TO VIRTUAL MACHINE COMMUNICATION

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

( * ) Notice: Subject to any disclaimer, the term of this patent is extended or adjusted under 35 U.S.C. 154(b) by 133 days.

(21) Appl. No.: 14/952,527

(22) Filed: Nov. 25, 2015

(65) Prior Publication Data

US 2017/0147376 A1  May 25, 2017

(51) Int. Cl.
- G06F 9/455 (2006.01)
- G06F 12/109 (2016.01)
- G06F 12/1009 (2016.01)
- G06F 13/42 (2006.01)

(52) U.S. Cl.
CPC ........ *G06F 9/45558* (2013.01); *G06F 12/109* (2013.01); *G06F 12/1009* (2013.01); *G06F 13/4282* (2013.01); *G06F 2212/152* (2013.01); *G06F 2212/657* (2013.01)

(58) Field of Classification Search
None
See application file for complete search history.

(56) References Cited

U.S. PATENT DOCUMENTS

| | | |
|---|---|---|
| 7,613,898 B2 | 11/2009 | Haertel et al. |
| 7,996,569 B2 | 8/2011 | Aloni et al. |
| 8,086,765 B2 | 12/2011 | Turner et al. |
| 8,214,576 B2 | 7/2012 | Chandrasekaran et al. |
| 8,701,126 B2 | 4/2014 | van Riel |
| 8,832,688 B2 | 9/2014 | Tang et al. |
| 2002/0073295 A1* | 6/2002 | Bowers ............... G06F 9/30189 711/200 |
| 2010/0011147 A1* | 1/2010 | Hummel ............. G06F 9/45558 711/6 |

(Continued)

OTHER PUBLICATIONS

Burtsev et al., "Fido: Fast Inter-Virtual-Machine Communication for Enterprise Appliances", University of Utah NetApp, Inc., excerpt from https://www.usenix.org/legacy/event/usenix09/tech/full_papers/burtsev/burtsev_html/ (12 pages).

(Continued)

*Primary Examiner* — Gregory A Kessler
(74) *Attorney, Agent, or Firm* — K&L Gates LLP

(57) ABSTRACT

In an example embodiment, a hypervisor exposes a virtual input-output memory management unit (IOMMU) to a first virtual machine. The first virtual machine includes a first guest operating system (OS). The hypervisor exposes a first virtual device to the first virtual machine. The hypervisor exposes a shared memory device to a second virtual machine. The second virtual machine includes a second guest OS. The hypervisor detects that the first guest OS modified the virtual IOMMU to provide access to a memory page of the first virtual machine. The hypervisor receives a base address from the second virtual machine. The base address is programmed into the shared memory device by the second virtual machine. The hypervisor maps the memory page into the second virtual machine at a page address, which is determined from the base address and a bus address.

20 Claims, 4 Drawing Sheets

(56) References Cited

U.S. PATENT DOCUMENTS

2011/0126195 A1   5/2011   Tsirkin

OTHER PUBLICATIONS

Kiszka et al., "Re: [Qemu-Devel] Using Virtio for Inter-VM Communication", Jun. 2014, excerpt from https://lists.gnu.org/archive/html/qemu-devel/2014-06/msg03254.html (2 pages).
Mohebbi et al., "ZIVM: A Zero-Copy Inter-VM Communication Mechanism for Cloud Computing", 2011, excerpt from http://ccsenet.org/journal/index.php/cis/article/view/6209 (1 page).
"A Shared Memory Zero-Copy Mechanism for ARM VMs: Vosyshmem", excerpt from http://www.virtualopensystems.com/en/products/vosyshmem-zerocopy/ (2 pages).

* cited by examiner

FIG. 2

| Page Table 200 | | |
|---|---|---|
| Page Entry 210A x0001 | 220A Read - Write | 230A Address of Unallocated Memory x01AF |
| Page Entry 210B x0002 | 220B Read Only | 230B Address of Unallocated Memory x01FF |
| Page Entry 210C X0003 | 220C Executable | 230C Address of Memory Allocated to App x024F |
| Page Entry 210D x0004 | 220D Write Only | 230D Address of Memory Allocated to App x029F |

Page Entry 202A
Page Entry 202B
Page Entry 202C
Page Entry 202D

INPUT OUTPUT MEMORY MANAGEMENT UNIT BASED ZERO COPY VIRTUAL MACHINE TO VIRTUAL MACHINE COMMUNICATION

BACKGROUND

The present disclosure relates generally to memory management of virtual machines in virtualized systems. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. The present disclosure provides improved systems and methods for managing memory in a virtual environment.

SUMMARY

The present disclosure provides new and innovative methods and system for virtual machine memory management. For example, a method includes exposing, by a hypervisor, a virtual input-output memory management unit (IOMMU) to a first virtual machine. The first virtual machine includes a first guest operating system (OS). The method further includes exposing, by the hypervisor, a first virtual device to the first virtual machine and exposing, by the hypervisor, a shared memory device to a second virtual machine. The second virtual machine includes a second guest OS. The method further includes detecting, by the hypervisor, that the first guest OS modified the virtual IOMMU to provide access to a memory page of the first virtual machine, and receiving, by the hypervisor, a base address from the second virtual machine. The base address is programmed into the shared memory device by the second virtual machine. The method further includes mapping, by the hypervisor, the memory page into the second virtual machine at a page address. The page address is determined from the base address and a bus address.

An example system includes a first memory having a memory page, one or more physical processors, a host operating system (OS), one or more virtual machines, and a hypervisor. The one or more physical processors are in communication with the first memory. The host OS executes on the one or more physical processors. The one or more virtual machines include at least one guest operating system (OS) that executes on the one or more physical processors. The hypervisor executes on the one or more processors to expose a virtual input-output memory management unit (IOMMU) to a first virtual machine of the one or more virtual machines. The first virtual machine includes a first guest operating system (OS). The hypervisor executes on the one or more processors to expose a first virtual device to the first virtual machine, and expose a shared memory device to a second virtual machine of the one or more virtual machines. The second virtual machine includes a second guest OS. The hypervisor executes on the one or more processors to detect that the first guest OS modified the virtual IOMMU to provide access to the memory page of the first virtual machine, and receive a base address from the second virtual machine. The base address is programmed into the shared memory device by the second virtual machine. The hypervisor executes on the one or more processors to map the memory page into the second virtual machine at a page address. The page address is determined from the base address and a bus address.

An example non-transitory machine readable medium stores a program which, when executed by a processor, causes a hypervisor to expose a virtual input-output memory management unit (IOMMU) to a first virtual machine. The first virtual machine includes a first guest operating system (OS). The non-transitory machine readable medium causes the hypervisor to expose a first virtual device to the first virtual machine, and expose a shared memory device to a second virtual machine. The second virtual machine includes a second guest OS. The non-transitory machine readable medium causes the hypervisor to detect that the first guest OS modified the virtual IOMMU to provide access to a memory page of the first virtual machine, and receive a base address from the second virtual machine. The base address is programmed into the shared memory device by the second virtual machine. The non-transitory machine readable medium causes the hypervisor to map the memory page into the second virtual machine at a page address. The page address is determined from the base address and a bus address.

Additional features and advantages of the disclosed method and apparatus are described in, and will be apparent from, the following Detailed Description and the Figures.

BRIEF DESCRIPTION OF THE FIGURES

FIG. 2 is a block diagram of an example page table according to an example embodiment of the present disclosure.

DETAILED DESCRIPTION OF EXAMPLE EMBODIMENTS

Figure 1:
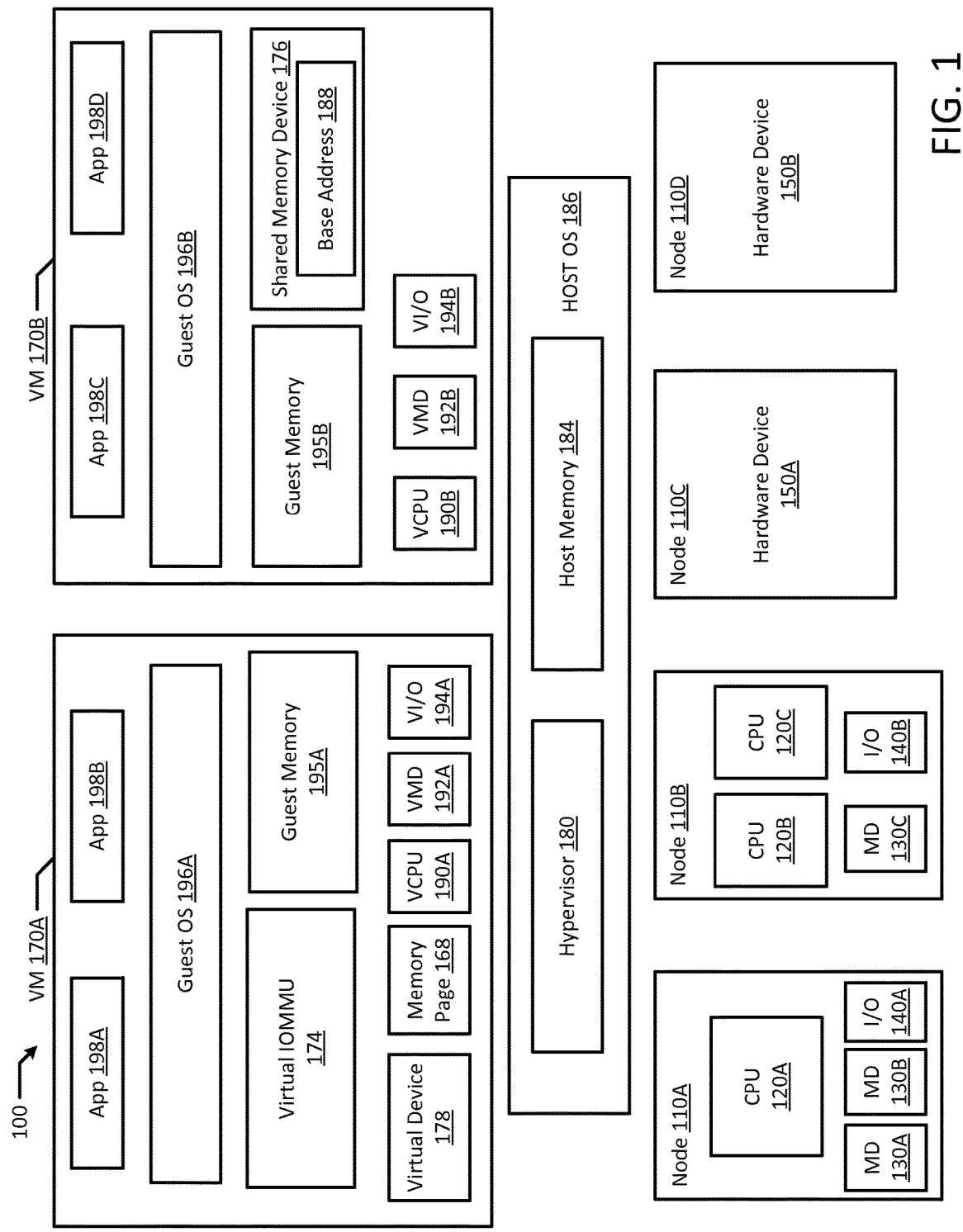
FIG. 1 is a block diagram of an example multiprocessor computer system according to an example embodiment of the present disclosure.

Techniques are disclosed for providing IOMMU based zero copy virtual machine (VM) to virtual machine communication. Generally, to share memory between two virtual machines, a virtual machine is required to allocate shared data in a specific shared memory region, which requires data copies for communication. Thus, there is a need for direct communication between virtual machines with a security mechanism in place to prevent a first virtual machine from accessing all of the memory of a second virtual machine.

In an example embodiment, a hypervisor may expose a virtual IOMMU and a virtual device to a first VM. For example, the virtual device may be given access to the virtual IOMMU. The virtual device makes certain parts of memory accessible. The hypervisor may also expose a shared memory device to a second VM. The hypervisor may detect that a first guest operating system (OS) of the first VM modified the virtual IOMMU to provide access to a memory page of the first virtual machine. The first guest OS of the first VM may also program the virtual IOMMU with a bus address. The virtual IOMMU may map the device address space (e.g., a bus address) into the physical address space or the virtual address space. The virtual IOMMU may also include extra information associated with the address space mapping, such as protection bits and permissions (e.g., read and write permissions). Then, the hypervisor may receive a base address programmed into the shared memory device from the second VM. Then, the hypervisor may map the memory page into the second VM at a page address. The access address may be the base address offset by the bus address.

Generally, when a device is exposed by a hypervisor, each device may request a specific size of memory (e.g., window) necessary to function. For example, the shared memory device and the virtual device may request a specific size of memory (e.g., window) necessary to function. The hypervisor may then assign a range of address that are programmed into the device (e.g., shared memory device). Generally, the base address may be the beginning of the window associated with the device.

Thus, the hypervisor only assigns the parts of memory (e.g., the memory page) that are made accessible by the virtual device. This advantageously enhances security and protection by preventing malicious programs from propagating across virtual machines and containing any security breach to a specific region of memory. Additionally, the method advantageously provides for flexible mapping for the second VM without needing to manage mapping tables. Furthermore, the added security is advantageously provided with low latency within network function virtualization (NFV).

Alternatives to the present disclosure, which provides additional security, involves using grant tables. Grant tables are harder to manage for guest operating systems and have a higher overhead because, in order to receive access, each domain needs to map tables and manage the translation tables. However, the present disclosure advantageously utilizes a virtual IOMMU and a virtual PCI device instead of grants. The virtual IOMMU and the virtual PCI device utilize the existing guest OS code (intended to manage physical IOMMU and physical PCI devices) for managing access permissions and allocating physical memory ranges, and in particular, allow additional benefit from any performance optimizations in the existing guest code. Thus, using grant tables requires higher maintenance cost and might achieve lower performance.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device, the operation of which is based on the processor inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-C, I/O 140A-B, a software device, and/or hardware device 150A-B.

As noted above, computer system 100 may run multiple virtual machines (e.g., VM 170A-B), by executing a software layer (e.g., hypervisor 180) above the hardware and below the virtual machines 170A-B, as schematically shown in FIG. 1. In an example embodiment, the hypervisor 180 may be a component of the host operating system 186 executed by the computer system 100. In another example embodiment, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to virtual machines 170A-B as devices, including virtual processors (e.g., VCPU 190A-B), virtual memory devices (e.g., VMD 192A-B), and/or virtual I/O devices (e.g., VI/O 194A-B).

In an example embodiment, a virtual machine 170A-C may execute a guest operating system 196A-B which may utilize the underlying VCPU 190A-B, VMD 192A-B, and VI/O devices 194A-B. One or more applications 198A-D may be running on a virtual machine 170A-B under the respective guest operating system 196A-B. Processor virtualization may be implemented by the hypervisor 180 scheduling time slots on one or more physical processors 120A-B such that from the guest operating system's perspective those time slots are scheduled on a virtual processor 190A-B.

The hypervisor 180 manages host memory 184 for the host operating system 186 as well as memory allocated to the virtual machines 170A-B and guest operating systems 196A-B such as guest memory 195A-B provided to guest OS 196A-B. Host memory 184 and guest memory 195A-B may be divided into a plurality of memory pages that are managed by the hypervisor 180. Guest memory 195A-B allocated to the guest OS 196A-B are mapped from host memory 184 such that when a guest application 198A-D uses or accesses a memory page of guest memory 195A-B it is actually using or accessing host memory 184.

The hypervisor 180 may expose additional devices to each virtual machine. For example, VM 170A may include a virtual input output memory management unit (IOMMU) 174 and a virtual device 178 that are exposed by the hypervisor. VM 170B may include a shared memory device 176 that is exposed by the hypervisor 180. The shared memory device 176 may include a base address 188. The base address 188 may be the beginning of the window (e.g., size of memory) associated with the shared memory device 176.

In an example embodiment, one or more page tables may be maintained by the hypervisor 180 for each of the VMs 170A-B, which maps virtual addresses to physical addresses that are accessible by each of the VMs 170A-B. Additionally, the first virtual machine 170A may include a memory page 168. For example, the virtual IOMMU 174 may be programmed by the first guest OS 196A to have access to the memory page 168.

FIG. 2 illustrates a page table 200 according to an example embodiment of the present disclosure. In general, the hypervisor 180 manages the memory usage of the VMs 170A-B. Both virtual memory and physical memory may be divided into pages, which are identified with a unique number (e.g., Page Frame Number (PFN) 210A-D).

A page table 200 is a data structure used by the hypervisor 180 to store a mapping of memory addresses of the guest OS 196A-B to memory addresses of the host OS 186. Accordingly, address translation is handled using page tables 200.

The page table 200 comprises page entries 202A-D that map PFN 210A-D (e.g., an address of the guest OS 196A-B) with an address 240A-D (e.g., an address of the host OS 186). Page tables 200 may be used together with any paging data structure used by the VMs 170A-B to support translation from guest OS 196A-B to host OS 186 addresses (e.g., 32-bit linear address space using a two-level hierarchical paging structure, Physical Address Extension mode, INTEL Extended Memory 64 Technology mode, etc.). In an example embodiment, page tables 200 may include protection identifiers 220A-D that indicate an access status for each of the pages.

In an example embodiment, page tables 200 may include a protection identifier 220A-D. The protection identifier 220A-D indicates the access status of a page corresponding to the page entry 202A-D of the page table 200. For example, a protection identifier 220A-D may be used to define that a given page is writable (or read-write), write-protected (or read-only), executable (or executable and readable), executable only, etc. For example, as illustrated in the example embodiment in FIG. 2, the page corresponding to page entry 202A, PFN 210A address (x0001), address 230A (x01AF), and protection identifier 220A has been defined in page table 200 as 'Read-Write'. The hypervisor 180 may be used to modify a protection identifier 220A-D of various pages. In addition, in an example embodiment, the page table 200 may include additional information not shown in FIG. 2 including statistics information, background information, dirty identifiers which indicate that modifications to a page must be written back to disk, etc.

In an example embodiment, one or more page tables 200 may be maintained by the hypervisor 180 which map guest OS 196A-B addresses to host OS 186 addresses that are accessible by the hypervisor 180, VMs 170, guest OS 196A-B, Host OS 186, and/or Host OS 186 resources. The sizes of different page tables may vary and may include more or fewer entries than are illustrated in FIG. 2.

Figure 3:
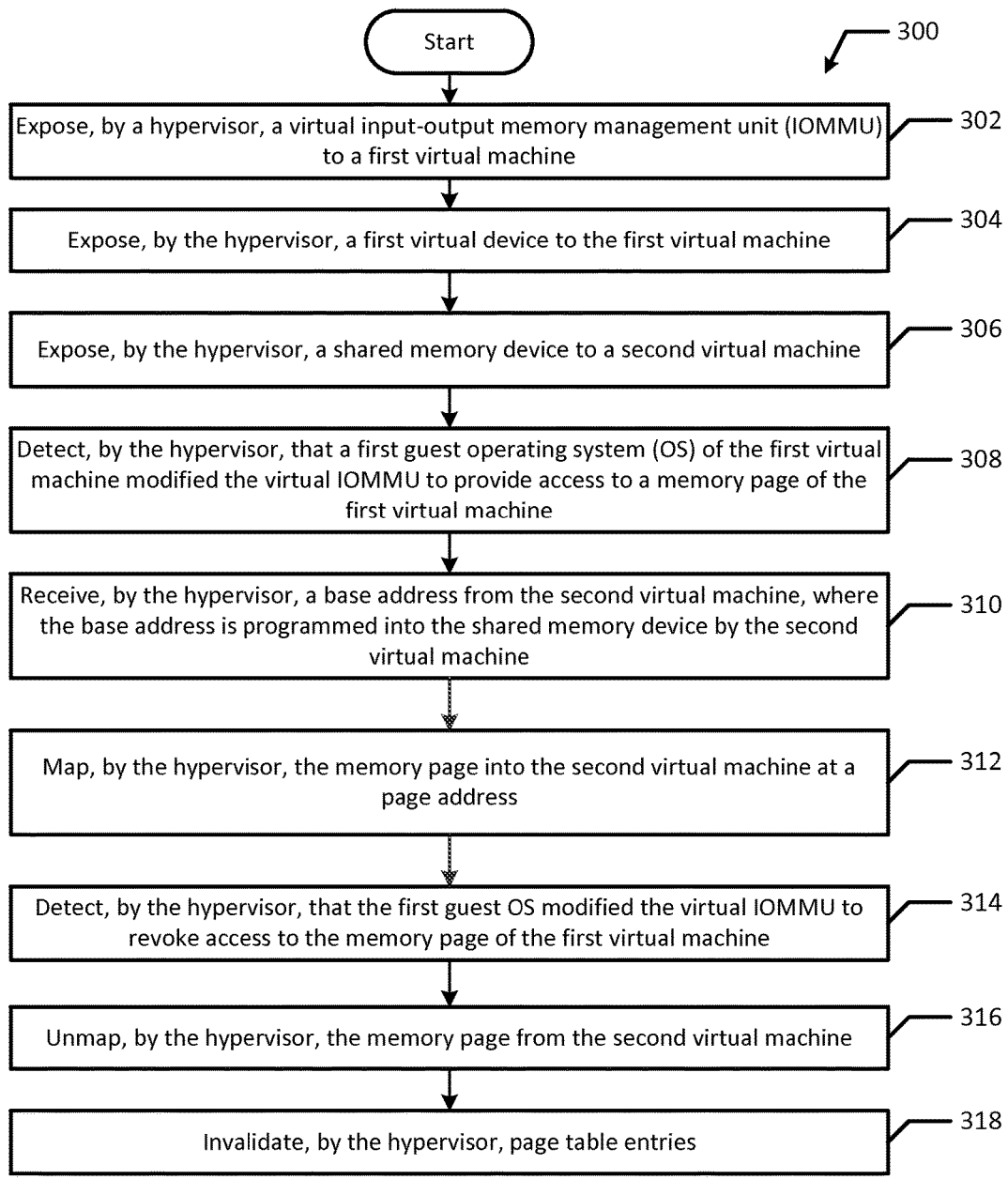
FIG. 3 is a flowchart illustrating an example method for virtual machine to virtual machine communication according to an example embodiment of the present disclosure.

FIG. 3 illustrates a flowchart of an example method for virtual machine to virtual machine communication according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. In an example embodiment, the method 300 may be performed by processing logic that may comprise hardware (circuitry, dedicated logic, etc.), software, or a combination of both. In an example embodiment, the method is performed by a hypervisor 180.

The example method 300 starts with a hypervisor exposing a virtual IOMMU to a first virtual machine 170A (block 302). For example, the hypervisor may expose the virtual IOMMU 174 to the guest OS 196A of the first virtual machine 170A. The example method 300 continues by the hypervisor exposing a first virtual device to the first virtual machine (block 304). For example, the hypervisor 180 may expose the first virtual device 178 to the guest OS 196A of the first virtual machine 170A. In an example embodiment, the first virtual device 178 may have access to the virtual IOMMU 174. The first virtual device 178 enables the guest OS 196A to communicate with the hypervisor 180 and the virtual device 178 may only be granted access to specific memory locations. The hypervisor also exposes a shared memory device to a second virtual machine (block 306). The shared memory device 176 may be a peripheral component interface (PCI) device. For example, the hypervisor may expose the shared memory PCI device 176 to a guest OS 196B of the second virtual machine 170B. In an example embodiment, the hypervisor may detect that a first guest OS (e.g., guest OS 196A) of the first virtual machine (e.g., VM 170A) modified the virtual IOMMU (e.g., virtual IOMMU 174) to provide access to a memory page (e.g., memory page 168) of the first virtual machine (e.g., VM 170A) (block 308). Then, the hypervisor (e.g., hypervisor 180) may receive a base address (e.g., base address 188) from the second virtual machine (e.g., VM 170B) (block 310). In an example embodiment, the base address 188 is programmed into the shared memory PCI device 176 by the second virtual machine 170B. The base address 188 may be an address or location that serves as a reference point for other memory locations (e.g., absolute addresses). For example, to obtain an absolute address, the base address 188 may be taken and an offset or displacement may be added to it. The base address may indicate the beginning of a device or program loaded into primary storage (e.g., main memory) and the absolute address of each individual program instruction may be specified by adding a displacement to the base address.

The hypervisor may also map the memory page into the second virtual machine at the page address (block 312). In an example embodiment, the hypervisor 180 may detect that the first guest OS 196A modified the virtual IOMMU 174 to change the access to the memory page of the first virtual machine. The hypervisor 180 may modify a page table for the second virtual machine 170B to match the access changed by the first guest OS 196A. For example, the first guest OS 196A may change the access to the memory page 168 from "read only" access to "read-write" access and the hypervisor may modify the page table by updating the protection identifier to match the access changed by the first guest OS 196A (e.g., change the protection identifier from "read only" to "read-write"). In an example embodiment, the hypervisor 180 may map the memory page 168 into the second virtual machine 170B by detecting a page fault of the second virtual machine 170B, detecting an access address of the second virtual machine 170B, and calculating the bus address. For example, a page fault may occur when the second guest OS 196B of the second virtual machine 170B accesses a memory page 168 that is mapped into the virtual address space, but not actually loaded into main memory. The access address is the address at which the second virtual machine 170B attempted to access the memory page 168. The bus address may be calculated as the access address offset by the base address. In an example embodiment, the hypervisor 180 may translate the bus address to a page address. For example, the bus address may be mapped to pages within a mapping (e.g., page table, list, etc.) in the virtual IOMMU 174. The mapping may be completed by mapping the page address into the memory of the second virtual machine 170B. For example, the hypervisor 180 may modify a page table for the second virtual machine 170B that maps the memory page 168 in the first virtual machine.

Then, the hypervisor (e.g., hypervisor 180) may detect that the first guest OS (e.g., guest OS 196A) modified the virtual IOMMU (e.g., virtual IOMMU 174) to revoke access to the memory page (e.g., memory page 168) of the first virtual machine (e.g., VM 170A) (block 314). The hypervisor (e.g., hypervisor 180) may unmap the memory page (e.g., memory page 168) from the second virtual machine (e.g., VM 170B) (block 316). In an example embodiment, the hypervisor (e.g., hypervisor 180) may unmap the memory page (e.g., memory page 168) by invalidating page table entries (block 318).

Figure 4:
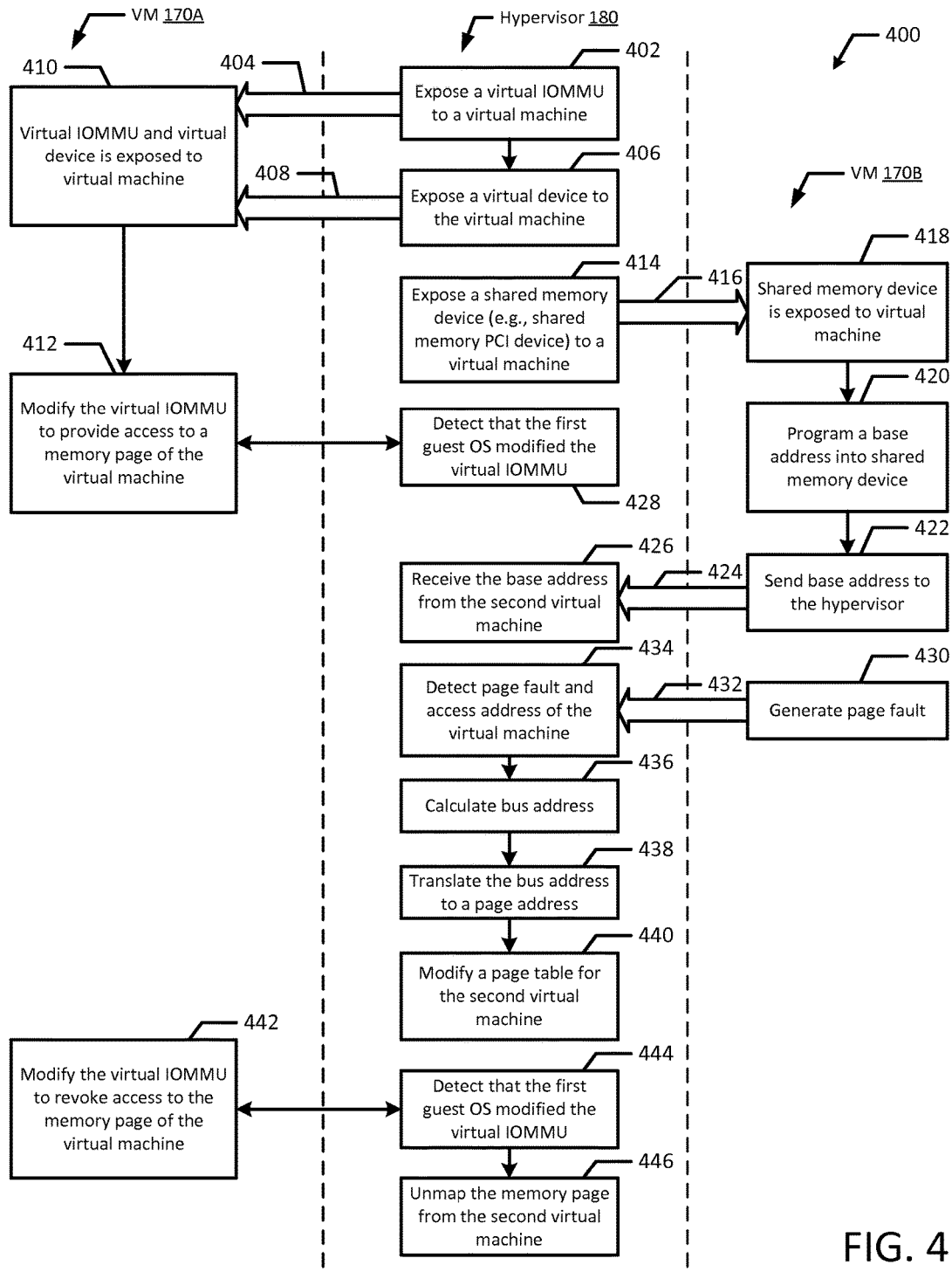
FIG. 4 is a flow diagram illustrating an example method for virtual machine to virtual machine communication according to an example embodiment of the present disclosure.

FIG. 4 illustrates a flow diagram of an example method for virtual machine to virtual machine communication according to an example embodiment of the present disclosure. Although the example method is described with reference to the flow diagram illustrated in FIG. 4, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (circuitry, dedicated logic, etc.), software, or a combination of both.

In the illustrated example embodiment, a hypervisor 180 is in communication with virtual machines 170A-B. In alternate example embodiments, the hypervisor 180 is in communication with virtual machines (e.g., VM 170A-B), applications (e.g., App 198A-D), virtual processors (e.g., VCPU 190A-C), virtual memory devices (e.g., VMD 192A-B), and/or virtual I/O devices (e.g., VI/O 194A-B).

The hypervisor 180 facilitates virtual machine to virtual machine communication by exposing a virtual IOMMU 174 to the first virtual machine 170A (blocks 402 and 404). Similarly, the hypervisor 180 may expose a virtual device 178 to the first virtual machine 170A (blocks 406 and 408). The virtual IOMMU 174 and the virtual device 178 are exposed in the first virtual machine 170A (block 410). The first virtual machine 170A may modify the virtual IOMMU 174 to provide access to a memory page 168 of the first virtual machine 170A (block 412). In an example embodiment, the first guest OS 196A of the first virtual machine 170A may modify the virtual IOMMU 174. The hypervisor 180 may also expose a shared memory device 176 to a second virtual machine 170B (blocks 414 and 416). In an example embodiment, the shared memory device may be a PCI device. The shared memory device is exposed to the second virtual machine 170B (block 418). Then, the second virtual machine 170B may program a base address 188 into the shared memory device 176 (block 420). The base address 188 may be the beginning of the window (e.g., size of memory) associated with the shared memory device 176. For example, the base address 188 may be an address or location that serves as a reference point for other memory locations (e.g., absolute addresses). Then, the second virtual machine 170B may send the base address 188 to the hypervisor 180 (blocks 422 and 424). The hypervisor 180 receives the base address from the second virtual machine 170B (block 426).

In an example embodiment, the hypervisor 180 may detect that the first guest OS 196A modified the virtual IOMMU 174 (block 428). For example, the hypervisor 180 may detect that the first guest OS 196A modified the virtual IOMMU 174 to change the access to the memory page of the first virtual machine 170A. The hypervisor 180 may modify a page table for the second virtual machine 170B to match the access changed by the first guest OS 196A. For example, the first guest OS 196A may change the access to the memory page 168 from "read only" access to "read-write" access and the hypervisor may modify the page table by updating the protection identifier to match the access changed by the first guest OS 196A (e.g., change the protection identifier from "read only" to "read-write").

In an example embodiment, the second virtual machine 170B may generate a page fault (blocks 430 and 432). For example, a page fault may occur when the second guest OS 196B of the second virtual machine 170B accesses a memory page 168 that is mapped into the virtual address space, but not actually loaded into main memory. Then, the hypervisor 180 may detect the page fault and access address of the second virtual machine 170B (block 434). For example, the access address may be the address at which the second virtual machine 170B attempted to access the memory page 168. Then, the hypervisor may calculate a bus address (block 436). For example, the hypervisor 180 may calculate the bus address by subtracting the base address from the access address. The hypervisor 180 may translate the bus address to a page address (block 438). Additionally, the hypervisor 180 may modify a page table for the second virtual machine 170B (block 440). For example, the hypervisor 180 may make an entry for the memory page 168 to indicate that it is loaded in memory.

In an example embodiment, the first virtual machine 170A may modify the virtual IOMMU 174 to revoke access to the memory page 168 of the first virtual machine 170A (block 442). For example, the first guest OS 196A of the first virtual machine 170A may modify the virtual IOMMU 174. Then, the hypervisor 180 may detect that the first guest OS 196A modified the virtual IOMMU 174 (block 444). In an example embodiment, the hypervisor 180 may detect that the first guest OS 196A modified the virtual IOMMU 174 to change the access to the memory page of the first virtual machine 170A. The hypervisor 180 may modify a page table for the second virtual machine 170B to match the access changed by the first guest OS 196A. For example, the first guest OS 196A may change the access to the memory page 168 from "read-write" access to "read only" access and the hypervisor may modify the page table by updating the protection identifier to match the access changed by the first guest OS 196A (e.g., change the protection identifier from "read-write" to "read only"). In an example embodiment, the hypervisor 180 may unmap the memory page 168 from the second virtual machine 170B (block 446). For example, the hypervisor 180 may unmap the memory page 168 from the second virtual machine 170B by invalidating page table entries, such as invalidating a specific bus address. Additionally, in an example embodiment, the hypervisor 180 may send an interrupt to clear all physical memory locations stored in cache (e.g., translation cache).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a method, includes exposing, by a hypervisor, a virtual input-output memory management unit (IOMMU) to a first virtual machine. The first virtual machine includes a first guest operating system (OS). The method further includes exposing, by the hypervisor, a first virtual device to the first virtual machine and exposing, by the hypervisor, a shared memory device to a second virtual machine. The second virtual machine includes a second guest OS. The method further includes detecting, by the hypervisor, that the first guest OS modified the virtual IOMMU to provide access to a memory page of the first virtual machine, and receiving, by the hypervisor, a base address from the second virtual machine. The base address is programmed into the shared memory device by the second virtual machine. The method further includes mapping, by the hypervisor, the memory page into the second virtual machine at a page address. The page address is determined from the base address and a bus address.

In accordance with another example aspect of the present disclosure, which may be used in combination with the preceding aspect, the shared memory device is a Peripheral Component Interface (PCI) device.

In accordance with another example aspect of the present disclosure, which may be used in combination with any one or more of the preceding aspects, access rights of the second virtual machine are established by the first guest OS.

In accordance with another example aspect of the present disclosure, which may be used in combination with any one or more of the preceding aspects, the mapping includes detecting, by the hypervisor, a page fault of the second virtual machine, and detecting, by the hypervisor, an access address of the second virtual machine.

In accordance with another example aspect of the present disclosure, which may be used in combination with any one or more of the preceding aspects, the method further includes calculating, by the hypervisor, the bus address. The bus address is determined from the access address and the base address. The method further includes translating, by the hypervisor, the bus address to a page address.

In accordance with another example aspect of the present disclosure, which may be used in combination with any one or more of the preceding aspects, the method further includes modifying, by the hypervisor, a page table for the second virtual machine. The page table maps the memory page in the first virtual machine.

In accordance with another example aspect of the present disclosure, which may be used in combination with any one or more of the preceding aspects, the method further includes detecting, by the hypervisor, that the first guest OS modified the virtual IOMMU to change the access to the memory page of the first virtual machine, and modifying, by the hypervisor, a page table for the second virtual machine to match the access changed by the first guest OS.

In accordance with another example aspect of the present disclosure, which may be used in combination with any one or more of the preceding aspects, the first guest OS modified the virtual IOMMU to include protection bits and the bus address of the memory page.

In accordance with another example aspect of the present disclosure, which may be used in combination with any one or more of the preceding aspects, the method further includes detecting, by the hypervisor, that the first guest OS modified the virtual IOMMU to revoke the access to the memory page of the first virtual machine, and unmapping, by the hypervisor, the memory page from the second virtual machine.

In accordance with another example aspect of the present disclosure, which may be used in combination with any one or more of the preceding aspects, the virtual IOMMU is configured to restrict the access to the memory page of the first virtual machine to a specific type of access by the first virtual device.

In accordance with another example aspect of the present disclosure, which may be used in combination with any one or more of the preceding aspects, the specific type of access is read only access.

In accordance with another example aspect of the present disclosure, which may be used in combination with any one or more of the preceding aspects, the method further includes invalidating, by the hypervisor, page table entries.

In accordance with another example aspect of the present disclosure, which may be used in combination with any one or more of the preceding aspects, unmapping the memory page includes sending, by the hypervisor, an interrupt to a central processing unit (CPU).

In a second example aspect of the present disclosure, a system includes a first memory having a memory page, one or more physical processors, a host operating system (OS), one or more virtual machines, and a hypervisor. The one or more physical processors are in communication with the first memory. The host OS executes on the one or more physical processors. The one or more virtual machines include at least one guest operating system (OS) that executes on the one or more physical processors. The hypervisor executes on the one or more processors to expose a virtual input-output memory management unit (IOMMU) to a first virtual machine of the one or more virtual machines. The first virtual machine includes a first guest operating system (OS). The hypervisor executes on the one or more processors to expose a first virtual device to the first virtual machine, and expose a shared memory device to a second virtual machine of the one or more virtual machines. The second virtual machine includes a second guest OS. The hypervisor executes on the one or more processors to detect that the first guest OS modified the virtual IOMMU to provide access to the memory page of the first virtual machine, and receive a base address from the second virtual machine. The base address is programmed into the shared memory device by the second virtual machine. The hypervisor executes on the one or more processors to map the memory page into the second virtual machine at a page address. The page address is determined from the base address and a bus address.

In accordance with another example aspect of the present disclosure, which may be used in combination with any one or more of the preceding aspects, the shared memory device is a Peripheral Component Interface (PCI) device.

In accordance with another example aspect of the present disclosure, which may be used in combination with any one or more of the preceding aspects, mapping the memory page into the second virtual machine includes detecting, by the hypervisor, a page fault of the second virtual machine, and detecting, by the hypervisor, an access address of the second virtual machine.

In accordance with another example aspect of the present disclosure, which may be used in combination with any one or more of the preceding aspects, the hypervisor is configured to calculate the bus address. The bus address is determined from the access address and the base address. The hypervisor is further configured to translate the bus address to a page address.

In accordance with another example aspect of the present disclosure, which may be used in combination with any one or more of the preceding aspects, the hypervisor is configured to modify a page table for the second virtual machine. The page table maps the memory page in the first virtual machine.

In accordance with another example aspect of the present disclosure, which may be used in combination with any one or more of the preceding aspects, the first guest OS is configured to modify the virtual IOMMU to include protection bits and the bus address of the memory page.

In accordance with another example aspect of the present disclosure, which may be used in combination with any one or more of the preceding aspects, the hypervisor is configured to detect that the first guest OS modified the virtual IOMMU to revoke the access to the memory page of the first virtual machine, and unmap the memory page from the second virtual machine. Unmapping the memory page includes sending an interrupt to a central processing unit (CPU).

In accordance with another example aspect of the present disclosure, which may be used in combination with any one or more of the preceding aspects, the virtual IOMMU is configured to restrict a specific type of access to the memory page of the first virtual machine from the first virtual device.

In accordance with another example aspect of the present disclosure, which may be used in combination with any one or more of the preceding aspects, the hypervisor is configured to invalidate page table entries.

In a third example aspect of the present disclosure, a non-transitory machine readable medium stores a program, which when executed by a processor, causes a hypervisor to expose a virtual input-output memory management unit (IOMMU) to a first virtual machine. The first virtual machine includes a first guest operating system (OS). The non-transitory machine readable medium causes the hypervisor to expose a first virtual device to the first virtual machine, and expose a shared memory device to a second virtual machine. The second virtual machine includes a second guest OS. The non-transitory machine readable medium causes the hypervisor to detect that the first guest OS modified the virtual IOMMU to provide access to a memory page of the first virtual machine, and receive a base address from the second virtual machine. The base address is programmed into the shared memory device by the second virtual machine. The non-transitory machine readable medium causes the hypervisor to map the memory page into the second virtual machine at a page address. The page address is determined from the base address and a bus address.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
exposing, by a hypervisor, a virtual input-output memory management unit (IOMMU) to a first virtual machine, wherein the first virtual machine includes a first guest operating system (OS);
exposing, by the hypervisor, a first virtual device to the first virtual machine;
exposing, by the hypervisor, a shared memory device to a second virtual machine, wherein the second virtual machine includes a second guest OS;
detecting, by the hypervisor, that the first guest OS modified the virtual IOMMU to provide access to a memory page of the first virtual machine, wherein access rights of the second virtual machine are established by the first guest OS;
receiving, by the hypervisor, a base address from the second virtual machine, wherein the base address is programmed into the shared memory device by the second virtual machine; and
mapping, by the hypervisor, the memory page into the second virtual machine at a page address, wherein the page address is determined from the base address and a bus address;
detecting, by the hypervisor, that the first guest OS modified the virtual IOMMU to revoke the access to the memory page of the first virtual machine; and
unmapping, by the hypervisor, the memory page from the second virtual machine.

2. The method of claim 1, wherein the shared memory device is a Peripheral Component Interface (PCI) device.

3. The method of claim 1, wherein access rights of the second virtual machine are established by the first guest OS.

4. The method of claim 1, wherein the mapping includes:
detecting, by the hypervisor, a page fault of the second virtual machine; and
detecting, by the hypervisor, an access address of the second virtual machine.

5. The method of claim 4, further comprising:
calculating, by the hypervisor, the bus address, wherein the bus address is determined from the access address and the base address; and
translating, by the hypervisor, the bus address to a page address.

6. The method of claim 1, further comprising:
modifying, by the hypervisor, a page table for the second virtual machine, wherein the page table maps the memory page in the first virtual machine.

7. The method of claim 1, further comprising:
detecting, by the hypervisor, that the first guest OS modified the virtual IOMMU to change the access to the memory page of the first virtual machine; and
modifying, by the hypervisor, a page table for the second virtual machine to match the access changed by the first guest OS.

8. The method of claim 1, wherein the virtual IOMMU is configured to restrict the access to the memory page of the first virtual machine to a specific type of access by the first virtual device.

9. The method of claim 8, wherein the specific type of access is read only access.

10. The method of claim 1, further comprising invalidating, by the hypervisor, page table entries.

11. The method of claim 1, wherein unmapping the memory page includes sending, by the hypervisor, an interrupt to a central processing unit (CPU).

12. A system comprising:
a first memory having a memory page;
one or more physical processors, in communication with the first memory;
a host operating system (OS) executing on the one or more physical processors;
one or more virtual machines, including at least one guest operating system (OS), executing on the one or more physical processors; and
a hypervisor executing on the one or more processors to:
expose a virtual input-output memory management unit (IOMMU) to a first virtual machine of the one or more virtual machines, wherein the first virtual machine includes a first guest operating system (OS),
expose a first virtual device to the first virtual machine,
expose a shared memory device to a second virtual machine of the one or more virtual machines, wherein the second virtual machine includes a second guest OS,
detect that the first guest OS modified the virtual IOMMU to provide access to the memory page of the first virtual machine, wherein access rights of the second virtual machine are established by the first guest OS,
receive a base address from the second virtual machine, wherein the base address is programmed into the shared memory device by the second virtual machine, and
map the memory page into the second virtual machine at a page address, wherein the page address is determined from the base address and a bus address.

13. The system of claim 12, wherein the shared memory device is a Peripheral Component Interface (PCI) device.

14. The system of claim 12, wherein the mapping the memory page into the second virtual machine includes:
detecting, by the hypervisor, a page fault of the second virtual machine; and
detecting, by the hypervisor, an access address of the second virtual machine.

15. The system of claim 12, wherein the hypervisor is configured to:
calculate the bus address, wherein the bus address is determined from the access address and the base address; and
translate the bus address to a page address.

16. The system of claim 12, wherein the hypervisor is configured to:
modify a page table for the second virtual machine, wherein the page table maps the memory page in the first virtual machine.

17. The system of claim 12, wherein the hypervisor is configured to:
detect that the first guest OS modified the virtual IOMMU to revoke the access to the memory page of the first virtual machine; and
unmap the memory page from the second virtual machine, wherein unmapping the memory page includes sending an interrupt to a central processing unit (CPU).

18. The system of claim 12, wherein the virtual IOMMU is configured to restrict a specific type of access to the memory page of the first virtual machine from the first virtual device.

19. A non-transitory machine-readable medium storing a program, which when executed by a processor, causes a hypervisor to:
expose a virtual input-output memory management unit (IOMMU) to a first virtual machine, wherein the first virtual machine includes a first guest operating system (OS);
expose a first virtual device to the first virtual machine;
expose a shared memory device to a second virtual machine, wherein the second virtual machine includes a second guest OS;
detect that the first guest OS modified the virtual IOMMU to provide access to a memory page of the first virtual machine;
receive a base address from the second virtual machine, wherein the base address is programmed into the shared memory device by the second virtual machine;
map the memory page into the second virtual machine at a page address, wherein the page address is determined from the base address and a bus address;
calculate the bus address, wherein the bus address is determined from the access address and the base address; and
translate the bus address to the page address.

20. The non-transitory machine-readable medium of claim 19, wherein the hypervisor is further caused to:
detect that the first guest OS modified the virtual IOMMU to revoke the access to the memory page of the first virtual machine; and
unmap the memory page from the second virtual machine.

* * * * *

UNITED STATES PATENT AND TRADEMARK OFFICE
CERTIFICATE OF CORRECTION

PATENT NO. : 9,875,132 B2  
APPLICATION NO. : 14/952527  
DATED : January 23, 2018  
INVENTOR(S) : Michael Tsirkin Page 1 of 1

It is certified that error appears in the above-identified patent and that said Letters Patent is hereby corrected as shown below:

In the Claims

In Column 12, Line 43 (Claim 1), replace "second virtual machine; and" with --second virtual machine;--.

Signed and Sealed this  
Tenth Day of April, 2018

Andrei Iancu  
*Director of the United States Patent and Trademark Office*